Mar. 13, 1923. 1,448,153
C. E. R. SCHNEIDER.
APPARATUS FOR SHOWING PICTURES IN RELIEF.
FILED JAN. 14, 1921.
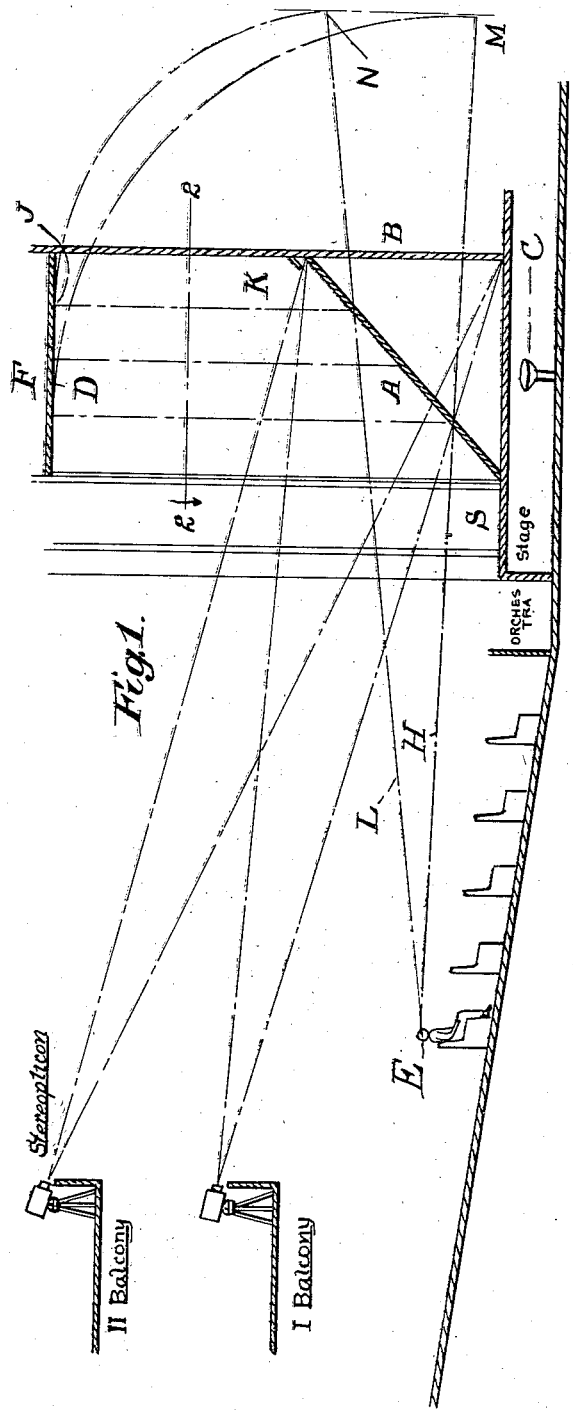
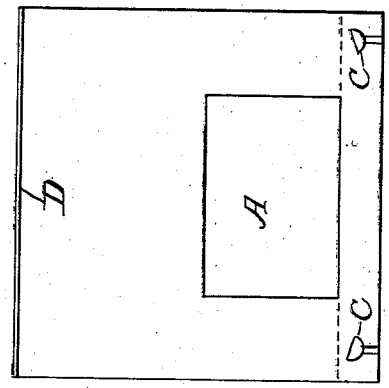
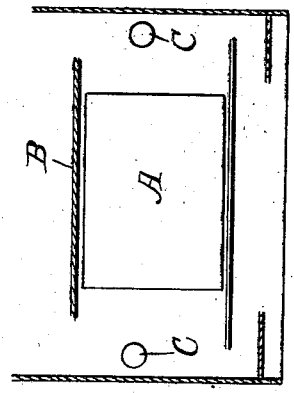
Inventor
Charles E. R. Schneider.
By his Attorney
Wm. H. Reid.

Patented Mar. 13, 1923.

1,448,153

UNITED STATES PATENT OFFICE.

CHARLES E. R. SCHNEIDER, OF NEW YORK, N. Y., ASSIGNOR TO THE PHOTOPLAST CORPORATION OF AMERICA, OF NEW YORK, N. Y., A CORPORATION OF NEW YORK.

APPARATUS FOR SHOWING PICTURES IN RELIEF.

Application filed January 14, 1921. Serial No. 437,323.

*To all whom it may concern:*

Be it known that I, CHARLES E. R. SCHNEIDER, a citizen of the United States of America, and resident of New York, in the county of New York and State of New York, have invented certain new and useful Improvements in Apparatus for Showing Pictures in Relief, of which the following is a full, clear, and exact description.

The object of this invention is to provide means for causing a screen projection, of either motion pictures, or still projections to have an improved effect, whereby the contrast between the dark and light portions are accentuated, and the picture definition and brilliancy is greatly improved.

A further object is to provide means for causing a reflection from an illuminated black surface to coincide with the picture projection, for producing the same results.

In the accompanying drawing showing embodiments of my invention, Fig. 1 is a sectional elevation, somewhat diagrammatical; Fig. 2 is a vertical section of the same, and Fig. 3 is a rear elevation.

The present invention is in the nature of an improvement or modification of the system or apparatus set forth in U. S. patent granted to me January 12, 1915, No. 1,124,665, Reissue No. 14,980, in that I employ an inclined transparent plate in front of the screen, and also position a surface or plate opposite the said transparent plate.

As shown in the drawing, on the stage S is arranged a vertical screen B, such as usually provided to receive the picture projection from a stereopticon, either still pictures or motion pictures, located at the rear of the auditorium, whereby the picture or images received on the screen B will be visible to the audience.

In front of the screen B, is located a plate A of suitable transparent material, such as glass, celluloid or other suitable transparent material; which plate is inclined to the screen B, preferably at an angle of about forty-five degrees, and as shown is inclined also to the horizontal floor of the stage. This plate will intercept the projected rays from the machine to the screen B, and also the return light rays from the screen to the audience; but by the known laws of optics these rays will pass through the transparent plate without interference, and no change or effect will be produced on these rays by this transparent plate. The margins of the transparent plate are preferably obscured by suitable means and the plate will not be perceptible to the audience.

Opposite the transparent plate A, I arrange means for causing the reflection from an illuminated black surface, and this reflection will fall on the plate in a path transverse to the projected rays from the picture machine. By the known laws of optics this reflection will be reflected from this transparent plate A to coincide with the said picture rays.

As shown, the plate D is provided with a black lower face opposite the inclined plate A, which is preferably opaque, as by covering the surface with a dull black cloth. I further cause light rays from a suitable source, such as spot lights arranged at C on either side of the stage, to be cast onto this black surface that will be thereby illuminated. The inclined plate A will cause a reflection of this illuminated black surface toward the observer in the audience, and such reflection will coincide with the projection of the picture rays to the audience. From this arrangement, the effect of the light and dark rays is highly accentuated, and a very intense picture definition is thereby obtained, and the picture will possess great brilliancy. It has been further found that by such an arrangement the auditorium can be illuminated, without interfering with the picture definition and effects; that does not obtain with the present picture projection, as illumination in the auditorium will dim the picture effect on the screen. This makes for greater safety, as in case of fire the audience being in a light room can readily escape.

What I claim is:—

1. In a projection system, the combination with a projecting machine, and a receiving screen, of an inclined plate located in front of the screen arranged to permit the picture projection to pass through without interference onto the screen, an illuminated black surface beyond the inclined plate arranged to cause reflection from said black surface to be projected onto the said inclined plate in a path substantially normal to the picture rays, whereby such projection will be reflected by the inclined plate to coincide with the picture light rays and will intensify the picture definition.

2. In a projection system, the combination with a projecting machine and a receiving screen, of a surface plate in front of and beyond the screen, means for causing a black illuminated color effect on the said plate, and a transparent plate located in front of the screen and opposite the surface plate that is inclined to both the screen and the said plate, whereby the picture projection will pass through the inclined plate without interference, while the said black effect above the inclined plate will be reflected by the surface plate to coincide with the picture rays and will greatly intensify the picture definition.

3. In a projection system, the combination with a projecting machine and a receiving screen, of a plate in front of and beyond the screen provided with a black surface, means for directing light rays on said surface, and a transparent plate located in front of the screen and opposite said illuminated surface that is inclined to both the screen and the said plate, whereby the picture projection will pass through the inclined plate without interference, while the said illuminated black color effect above the inclined plate will be reflected by the surface plate to coincide with the picture rays and will greatly intensify the picture definition.

Signed at New York city, N. Y., on December 4th, 1920.

CHARLES E. R. SCHNEIDER.